(12) United States Patent
Seo et al.

(10) Patent No.: US 11,867,560 B2
(45) Date of Patent: Jan. 9, 2024

(54) NON-CONTACT TEMPERATURE MEASURING DEVICE

(71) Applicant: ADDPLUS Co., Ltd, Daegu (KR)

(72) Inventors: Sang Wan Seo, Gyeongsan-si (KR); Ji Hyun Kim, Daegu (KR)

(73) Assignee: ADDPLUS CO., LTD, Daegu (KR)

( * ) Notice: Subject to any disclaimer, the term of this patent is extended or adjusted under 35 U.S.C. 154(b) by 748 days.

(21) Appl. No.: 17/028,095

(22) Filed: Sep. 22, 2020

(65) Prior Publication Data
US 2021/0364357 A1  Nov. 25, 2021

(51) Int. Cl.
*G01J 5/00* (2022.01)
*G01J 5/02* (2022.01)
*G08B 21/18* (2006.01)
*G01S 13/08* (2006.01)

(52) U.S. Cl.
CPC ............ *G01J 5/0265* (2013.01); *G01S 13/08* (2013.01); *G08B 21/182* (2013.01)

(58) Field of Classification Search
CPC ............ G01C 3/08; G01C 21/20; G01C 3/00
USPC ................. 250/338.1; 702/135, 136
See application file for complete search history.

(56) References Cited

U.S. PATENT DOCUMENTS

| | | | | |
|---|---|---|---|---|
| 4,407,295 A * | 10/1983 | Steuer | ............... | A61B 5/6816 |
| | | | | D24/186 |
| 6,846,106 B1 * | 1/2005 | Chen | .................. | A61B 5/01 |
| | | | | 340/407.1 |
| 10,426,355 B2 * | 10/2019 | Ho | ..................... | G01J 5/021 |
| 2006/0050766 A1 * | 3/2006 | Hollander | ......... | G01J 5/0275 |
| | | | | 374/121 |
| 2016/0316119 A1 * | 10/2016 | Kent | .................. | G01J 5/0804 |
| 2017/0296088 A1 * | 10/2017 | Choi | .................. | A61B 5/7271 |
| 2020/0003623 A1 | 1/2020 | Bellifemine | | |

FOREIGN PATENT DOCUMENTS

| | | | | |
|---|---|---|---|---|
| CN | 111854967 A | * | 10/2020 | |
| DE | 202018103693 U1 | * | 9/2018 | |
| JP | 2011177499 A | * | 9/2011 | ............ A61B 5/01 |
| KR | 20-2020-0000395 U | | 2/2020 | |
| KR | 20210144320 A | * | 11/2021 | |
| KR | 102356509 B1 | * | 1/2022 | |

* cited by examiner

*Primary Examiner* — Gail Kaplan Verbitsky
(74) *Attorney, Agent, or Firm* — INVENSTONE PATENT, LLC

(57) ABSTRACT

A non-contact temperature measuring device for an accessory comprises a body unit; a fixing unit to which the body unit is coupled; a distance sensor configured to measure a distance to an object; a temperature sensor configured to measure a temperature of the object; a control unit operatively connecting the distance sensor and the temperature sensor to obtain the temperature of the object; a display unit displaying the temperature obtained; and a connector configured to supply power, wherein the fixing unit includes a coupling part including a receiving groove capable of receiving the connector of the body unit, a support part connected to the coupling part and having an adhesive surface for bonding to another device; and an outer part configured to be connected to the coupling part, and when the body unit is fastened to the coupling part, surround an outer surface of the body unit.

14 Claims, 10 Drawing Sheets

NON-CONTACT TEMPERATURE MEASURING DEVICE

CROSS-REFERENCE TO RELATED APPLICATIONS

This application claims the priority benefit of Korean Patent Application No. 10-2020-0061519 filed on May 22, 2020, with the Korean Intellectual Property Office, the disclosure of which is incorporated herein by reference.

BACKGROUND

Technical Field

The present disclosure relates to a non-contact temperature measuring device that is easily portable.

Background Art

Methods for measuring temperature can be broadly divided into a contact method and a non-contact method. Contact thermometers include mercury thermometers, alcohol thermometers, and NTC thermometers that can detect body temperature by being in contact with the armpits, oral cavity, anus and the like. Conventionally widely used non-contact thermometers include infrared thermometers that measure body temperature by detecting infrared wavelengths emitted from the eardrum, and the like.

However, as the contact thermometers described above require direct contact with the skin and the surface of an object, infection due to the contact may occur. Furthermore, thermometers for measuring body temperature through the eardrum are also not a completely non-contact method. Thus, the measurement of body temperature through the eardrum may cause infection due to contact, similar to the contact thermometers.

Meanwhile, the most fundamentally essential factor in health management of infants and toddlers is body temperature information. Infants and toddlers, unlike adults, have weak immune systems, so even slight changes in body temperature thereof can lead to diseases such as hypothyroidism, otitis media, sepsis and pneumonia. Therefore, the body temperature of infants and toddlers should be frequently measured by their parents to promptly identify the cause thereof and take action. However, the above-described thermometers have a risk of contact infection in infants and toddlers with weak immune systems, and it may be difficult to properly measure their body temperatures since the infants and toddlers may be reluctant to contact the thermometers.

Further, since the conventional thermometer for measuring body temperature through the eardrum has a certain size and volume, portability thereof is not facilitated. Accordingly, it may be difficult to measure the body temperature of infants and toddlers immediately in external environments outside home.

Furthermore, as interests in health have increased in recent years, technologies for various types of health care (blood pressure, blood sugar, body fat and the like) capable of checking one's health on a small electronic device such as a smartphone that is easily portable and carried all the time for more efficient health management are being developed.

Accordingly, there is a demand for a non-contact thermometer which is small in volume and size to thereby be easily portable, allows for a simple use thereof so that anyone can easily use it, and has a little risk of infection.

The background art of the invention has been written to facilitate understanding of the present disclosure. Thus, it should not be understood as acknowledging that matters described in the background art of the invention exist in the prior arts.

SUMMARY

An object to be achieved by the present disclosure is to provide a non-contact temperature measuring device.

More specifically, an object to be achieved by the present disclosure is to provide a non-contact temperature measuring device, which can be attached anywhere on a portable device due to a small volume thereof and thus, easily carried, can be used promptly at any time by a user, and has a reduced risk of infection in a non-contact manner.

The technical problems to be solved in this specification are not limited to the technical problems mentioned above, and other technical problems to be solved will be clearly understood by the skilled person in the art from the following description.

In order to solve the problems as described above, a temperature measuring device according to an exemplary embodiment of the present disclosure is provided. The temperature measuring device includes a body unit; a fixing unit to which the body unit is coupled; a distance sensor configured to measure a distance to an object; a temperature sensor configured to measure a temperature of the object; a control unit operatively connecting the distance sensor and the temperature sensor to obtain the temperature of the object; a display unit displaying the temperature obtained; and a connector configured to supply power, wherein the fixing unit may include a coupling part including a receiving groove capable of receiving the connector of the body unit; a support part connected to the coupling part and having an adhesive surface for bonding to another device; and an outer part configured to be connected to the coupling part, and when the body unit is fastened to the coupling part, surround an outer surface of the body unit.

According to features of the present disclosure, the temperature measuring device according to an exemplary embodiment of the present disclosure may further include an alarm unit configured to be connected to the control unit and generate an alarm; and a communication unit configured to transmit the temperature that is measured by the temperature sensor and calculated by the control unit to an external device.

According to another feature of the present disclosure, the body unit of the temperature measuring device according to an exemplary embodiment of the present disclosure may further include a measurement button disposed on a side surface of the body unit, and the coupling part may have rotation guide holes in both sides thereof so that the outer part is coupled to the rotation guide holes.

In this case, the outer part may include rotation guides that protrude to both inner surfaces thereof and are received in the rotation guide holes, and may be rotated to form a certain angle with the support part.

According to still another feature of the present disclosure, a groove portion of the temperature measuring device according to an exemplary embodiment of the present disclosure may include a hole exposing the distance sensor and the temperature sensor, and the support part may include a rotating plate on a rear surface thereof.

According to still another feature of the present disclosure, the control unit of the temperature measuring device according to an exemplary embodiment of the present disclosure may be further configured to transmit an alarm signal to the alarm unit when measurement of the temperature of the object is completed.

In addition, the control unit may be configured to measure the distance to the object through the distance sensor, measure the temperature of the object through the temperature sensor when the distance measured to the object is within a predetermined range, and transmit the temperature measured to the display unit to thereby display temperature information through the display unit. In this case, the predetermined range may be 2 cm to 5 cm, but is not limited thereto.

Also, the control unit may be configured to transmit a display signal to the display unit and display a measurable state on the display unit, when the distance measured to the object is within a predetermined range.

Further, the control unit may be configured to automatically discontinue a power supply and be turned off when there is no measurement signal within a predetermined period of time, and the control unit may be configured to store information on a date and time at which the temperature is measured, together with the temperature.

Hereinafter, the present disclosure will be described in more detail through embodiments. However, these embodiments are for illustrative purposes only, and the scope of the present disclosure should not be construed as being limited by these embodiments.

According to various embodiments of the present disclosure, since the non-contact temperature measuring device is capable of measuring body temperature in a non-contact manner, it is feasible to measure body temperature more hygienically than a conventional body temperature measuring device, and reduce risks from contact infectious diseases.

In addition, as the non-contact temperature measuring device has a small size, it can be attached to any portable device such as a smartphone, thereby allowing for easy portability, and it can be carried at any time in an attached form by a user, thereby enabling the user to easily measure temperature of an abject to be measured anytime.

In addition, the non-contact temperature measuring device includes not only a temperature measurement function, but also includes a grip function that can be attached to a user's portable device to prevent the portable device from falling, and a cradle function that can stand the portable device at a certain angle. Thus, convenience of the user's portable device can be increased.

In addition, the non-contact temperature measuring device may directly receive electrical energy from an external device using an internal connector and may be supplied with power. Therefore, the non-contact temperature measuring device may be used without having a battery itself, and thus, may not include a battery. Accordingly, the non-contact temperature measuring device may be lighter in weight and thus, more portable.

The effect of the flexible display device according to the exemplary embodiment of the present disclosure is not limited by the contents exemplified above, and more various effects are included in the present disclosure.

DETAILED DESCRIPTION OF EMBODIMENTS

Figure 1:
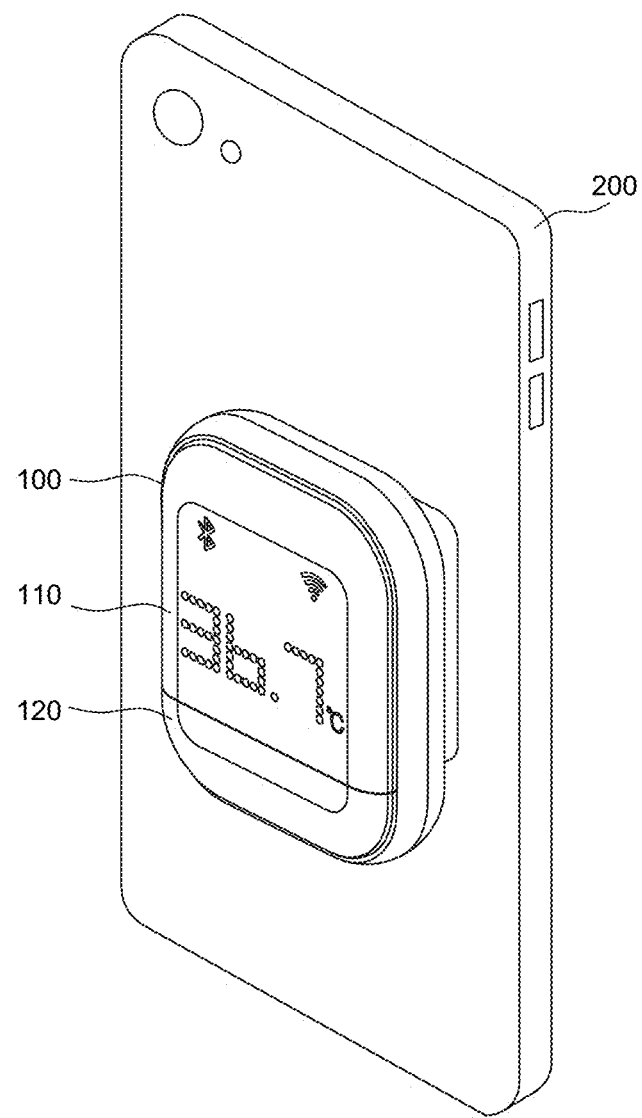
FIG. 1 is an exemplary view for explaining an application of a non-contact temperature measuring device according to an exemplary embodiment of the present disclosure.

Advantages and features of the present disclosure and methods to achieve them will become apparent from descriptions of exemplary embodiments herein below with reference to the accompanying drawings. However, the present disclosure is not limited to the exemplary embodiments disclosed herein but may be implemented in various different forms. The exemplary embodiments are provided to make the description of the present disclosure thorough and to fully convey the scope of the present disclosure to those skilled in the art. It is to be noted that the scope of the present disclosure is defined only by the claims. In connection with the description of drawings, the same or like reference numerals may be used for the same or like elements.

In the disclosure, expressions "have," "may have," "include" and "comprise," or "may include" and "may comprise" used herein indicate presence of corresponding features (for example, elements such as numeric values, functions, operations, or components) and do not exclude the presence of additional features.

In the disclosure, expressions "A or B," "at least one of A or/and B," or "one or more of A or/and B," and the like used herein may include any and all combinations of one or more of the associated listed items. For example, the "A or B," "at least one of A and B," or "at least one of A or B" may refer to all of case (1) where at least one A is included, case (2) where at least one B is included, or case (3) where both of at least one A and at least one B are included.

The expressions, such as "first," "second," and the like used herein, may refer to various elements of various embodiments of the present disclosure, but do not limit the order and/or priority of the elements. Furthermore, such expressions may be used to distinguish one element from another element. For example, "a first user device" and "a second user device" indicate different user devices regardless of the order or priority. For example, without departing from the scope of the present disclosure, a first element may be referred to as a second element, and similarly, a second element may also be referred to as a first element.

It will be understood that when an element (for example, a first element) is referred to as being "(operatively or communicatively) coupled with/to" or "connected to" another element (for example, a second element), it can be understood as being directly coupled with/to or connected to another element or coupled with/to or connected to another element via an intervening element (for example, a third element). On the other hand, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present disclosure are used to describe specified embodiments of the present disclosure and are not intended to limit the scope of other embodiments. The terms of a singular form may include plural forms unless otherwise specified. All the terms used herein, which include technical or scientific terms, may have the same meaning that is generally understood by a person skilled in the art. It will be further understood that terms which are defined in a dictionary among terms used in the disclosure, can be interpreted as having the same or similar meanings as those in the relevant related art and should not be interpreted in an idealized or overly formal way, unless expressly defined in the present disclosure. In some cases, even in the case of terms which are defined in the specification, they cannot be interpreted to exclude embodiments of the present disclosure.

Features of various exemplary embodiments of the present disclosure may be partially or fully combined or coupled. As will be clearly appreciated by those skilled in the art, technically various interactions and operations are possible. Various exemplary embodiments can be practiced individually or in combination.

Hereinafter, embodiments of the present disclosure will be described in detail with reference to accompanying drawings.

FIG. 1 is an exemplary view for explaining an application of a non-contact temperature measuring device according to an exemplary embodiment of the present disclosure.

First, a non-contact temperature measuring device 100 according to an exemplary embodiment of the present disclosure may be a temperature measuring device for measuring a temperature of an object. More specifically, the non-contact temperature measuring device 100 which is a small accessory type device that can be attached to and used in various items and places, may be a thermometer that is easily portable and can be carried by a user at any time and measure temperature of various objects. Further, the non-contact temperature measuring device 100 may be a non-contact thermometer using a sensor that measures an infrared wavelength of an object.

In this case, an object to be measured (hereinafter, also referred to as a "measurement object") may include anything that can be measured through infrared wavelengths, such as animals, humans, things, and food.

The non-contact temperature measuring device 100 according to the embodiment of the present disclosure includes a body unit 110 and a fixing unit 120. In this case, the body unit 110 may be kept in a state in which it is coupled to the fixing unit 120.

In addition, the non-contact temperature measuring device 100 may be used in a manner that a rear surface of the fixing unit 120 is attached to an external device 200 in the state in which the body unit 110 is coupled to the fixing unit 120. However, the non-contact temperature measuring device 100 is not limited only to a form in which it is attached to the external device 200 as described above, and may be attached to various articles and places, and may also be used alone without attachment.

In this case, the external device 200 may be an electronic device capable of receiving measurement information from the non-contact temperature measuring device 100 by including a communication function. For example, the external device 200 may include at least one among a smart phone, a tablet PC, a mobile phone, a video phone, an e-book reader, a desktop PC (desktop personal computer), a laptop PC (laptop personal computer), a netbook computer, a PDA (personal digital assistant), a PMP (portable multimedia player), a MP3 player, a camera, a wearable device, an electronic clothing, an electronic appcessory, a smart watch, a smart home appliance, a medical device, and a navigation, in which an application, a program, a widget, a browser or the like is installed, but is not limited thereto.

In addition, a coupled form of non-contact temperature measuring device 100 is a small device having a size capable of being attached to the electronic device 200 such as a smartphone. For example, the coupled form of the non-contact temperature measuring device 100 may have a size of 2 cm in width and length, but is not limited thereto and may have various sizes. Further, the coupled form of the non-contact temperature measuring device 100 is illustrated to have a square shape in which all corners are rounded, but is not limited thereto, and may be formed in various shapes such as a circle, a rectangle, a trapezoid, and a heart shape.

Accordingly, the present disclosure can provide the non-contact temperature measuring device 100 that can be easily kept and carried by a user at any time due to a small size thereof.

Hereinafter, a structure and driving of the non-contact temperature measuring device 100 will be described in detail with reference to FIGS. 2A to 5.

Figure 2A:
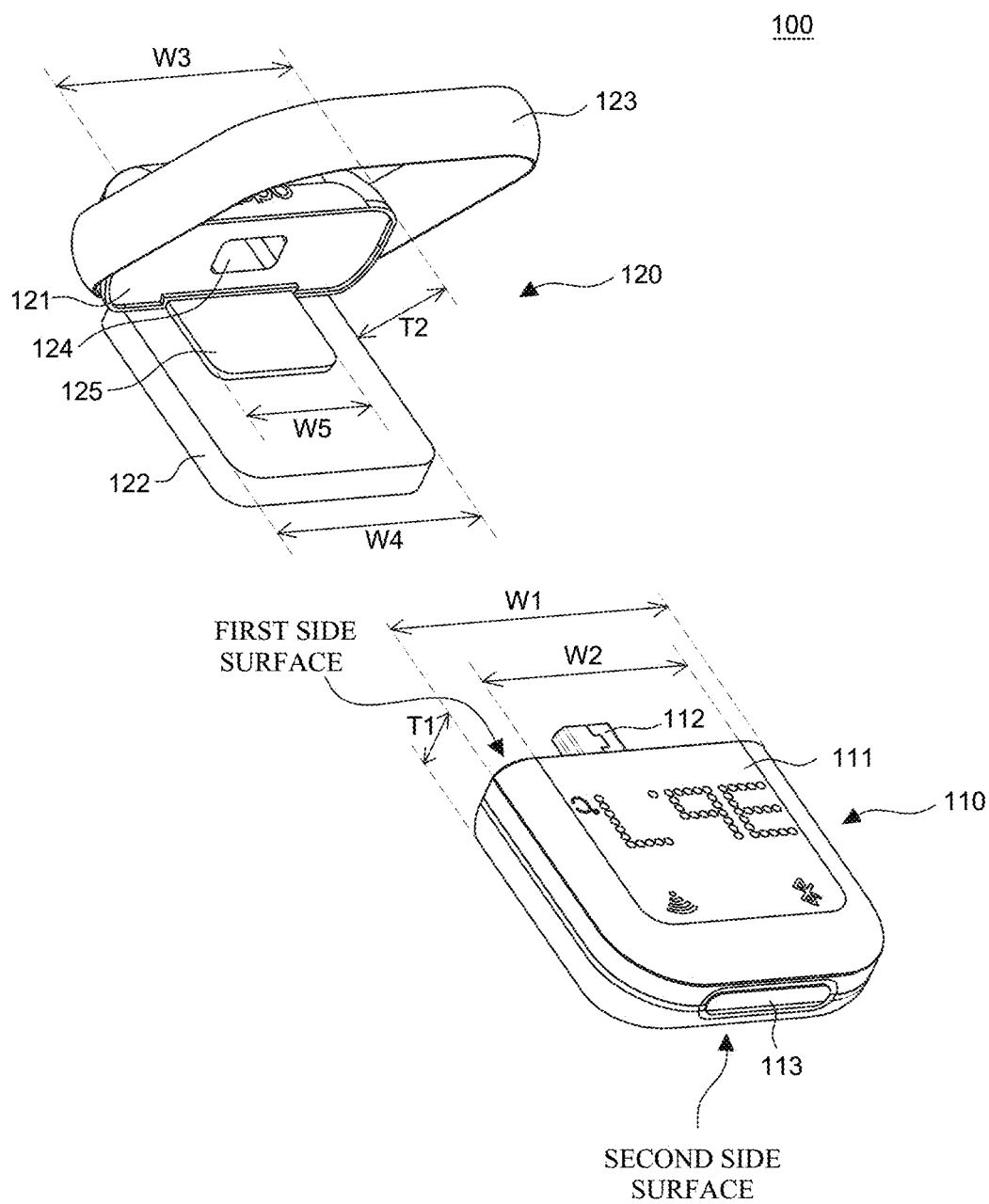
FIG. 2A is a front perspective view for explaining the non-contact temperature measuring device according to an exemplary embodiment of the present disclosure.

FIG. 2A is a front perspective view for explaining the non-contact temperature measuring device according to an exemplary embodiment of the present disclosure.

Referring to FIG. 2A, the non-contact temperature measuring device 100 may include the body unit 110 and the fixing unit 120.

In this case, the body unit 110 may include a display unit 111, a connector 112, and a measurement button 113, and the fixing unit 120 may include a coupling part 121, a support part 122, and an outer part 123.

More specifically, first, the display unit 111 of the body unit 110 is disposed on a front surface of the body unit 110 and may be spaced apart from both sides and a second side surface of the body unit 110 by predetermined distances and have a width W2 smaller than a width W1 of the body unit 110. However, the size of the display unit 111 is not limited thereto, and may be formed in various sizes within the body unit 110. For example, the display unit 111 may be formed to have a size corresponding to a front surface size of the body unit 110.

The display unit 111 may display various types of information. For example, the display unit 111 may visually display a temperature of an object measured from the body unit 110 and further, the display unit 111 may display an ON/OFF state of the non-contact temperature measuring device 100, whether or not the non-contact temperature measuring device 100 is operated, time, date, and a communication state (whether communication such as Bluetooth or Wi-Fi is connected or not). However, the present disclosure is not limited thereto, and various types of information collected from the non-contact temperature measuring device 100 may be displayed.

The connector 112 may be disposed on a first side surface of the body unit. The connector 112 is illustrated in a 5-pin form but is not limited thereto, and may include all of various forms such as an 8-pin connector and a C-type connector, capable of moving electricity, that is, supplying power, from the outside.

The measurement button 113 may be disposed on the second side surface of the body unit 110, but is not limited thereto, and may be disposed on all side surfaces except for the first side surface on which the connector is present. Further, the measurement button 113 does not necessarily need to be included in the body unit 110, and when the display unit 111 is a touch screen or the non-contact temperature measuring device 100 is connected to the external device 200 where an application having a measurement function is installed, the measurement button 113 may not be included in the body unit 110.

The coupling part 121 of the fixing unit 120 may include a receiving groove 124 capable of receiving the connector 112 of the body unit 110 and may have a width W3 and a thickness T2 corresponding to the width W1 and a thickness T1 of the body unit 110, respectively. As the coupling part 121 includes the receiving groove 124 and has the same size as the first side surface of the body unit 110, the connector 112 of the body unit 110 may be stored in and coupled to the coupling part 121.

Further, the coupling part 121 may include rotation guide holes in both sides thereof so that the outer part 123 can be coupled to the rotation guide holes.

Furthermore, the coupling part 121 may be configured to be detachable from the first side surface of the body unit 110 on which the connector is present. In this case, the coupling part 121 may be provided with a fastening member capable of being detachably coupled to the first side surface of the body unit 110. For example, the fastening member may be provided in a form such as a protrusion or a hook, or may be provided in a form capable of being coupled by magnetism. However, the fastening member is not necessarily provided in the coupling part 121.

The support part 122 may include a protrusion portion 125. In this case, the protrusion portion 125 is a guide for stably placing the body unit 110 in a horizontal state, and may have a width W5 smaller than a width W4 of the support part 122.

Further, the support part 122 may have the width W4 smaller than the width W1 of the body unit 110, but is not limited thereto.

Furthermore, the support part 122 may be formed to be connected to the coupling part 121.

The outer part 123 may include rotation guides that protrude to both inner surfaces thereof and can be received in the rotation guide holes of the coupling part 121, so that the outer part 123 may be connected to the coupling part 121. Further, as the rotation guides are received and fixed in the rotation guide holes of the coupling part 121, the outer part 123 may be rotated to form a certain angle with the coupling part 121 and the support part 122.

Furthermore, when the body unit 110 is fastened to the coupling part 121, the outer part 123 may be formed to cover an outer surface of the body unit 110. Accordingly, the body unit 110 may be stably fixed to the fixing unit 120, whereby separation thereof can be prevented.

Figure 2B:
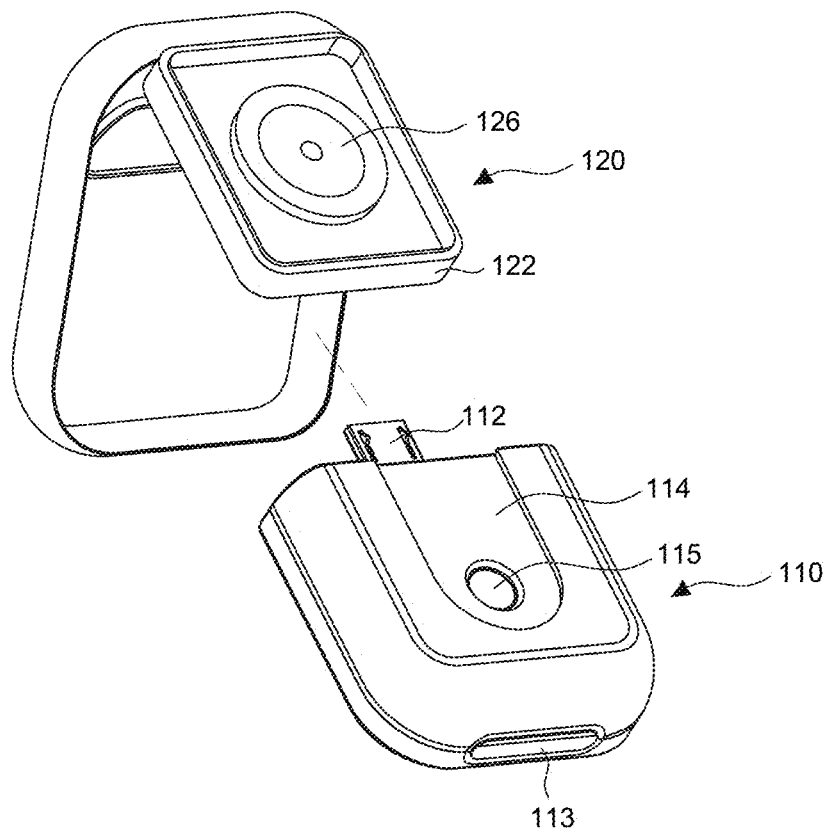
FIG. 2B is a rear perspective view for explaining the non-contact temperature measuring device according to an exemplary embodiment of the present disclosure.

Further, FIG. 2B is a rear perspective view for explaining the non-contact temperature measuring device according to an exemplary embodiment of the present disclosure.

Referring to FIG. 2B, the non-contact temperature measuring device 100 may include the body unit 110 and the fixing unit 120. The body unit 110 may include a groove portion 114 and a hole 115, and the fixing unit 120 may include a rotating plate 126.

First, the groove portion 114 of the body unit 110 is disposed in a rear surface of the body unit, and may be formed in a size and shape corresponding to the protrusion portion 125 of the support part 122. This groove portion 114 may be coupled to correspond to the protrusion portion 125 of the support part 122 and guide the body unit 110 to be stably disposed in the fixing unit 120 in a horizontal state.

The hole 115 is disposed in the rear surface of the body unit 110 and may be formed to expose a distance sensor and a temperature sensor. At this time, the hole 115 is illustrated in a spherical shape, but is not limited thereto, and may be variously formed in size and shape according to a size and shape of the distance sensor and the temperature sensor.

Then, the rotating plate 126 of the fixing unit 120 may be formed on a rear surface of the support part 122 of the fixing unit 120 and may include an adhesive surface. Accordingly, the non-contact temperature measuring device 100 may be adhered to electronic devices, articles, and places through the adhesive surface provided on the rotating plate 126 and may be rotated even in an adhered state, so that a direction thereof can be set to various positions.

Figure 3:
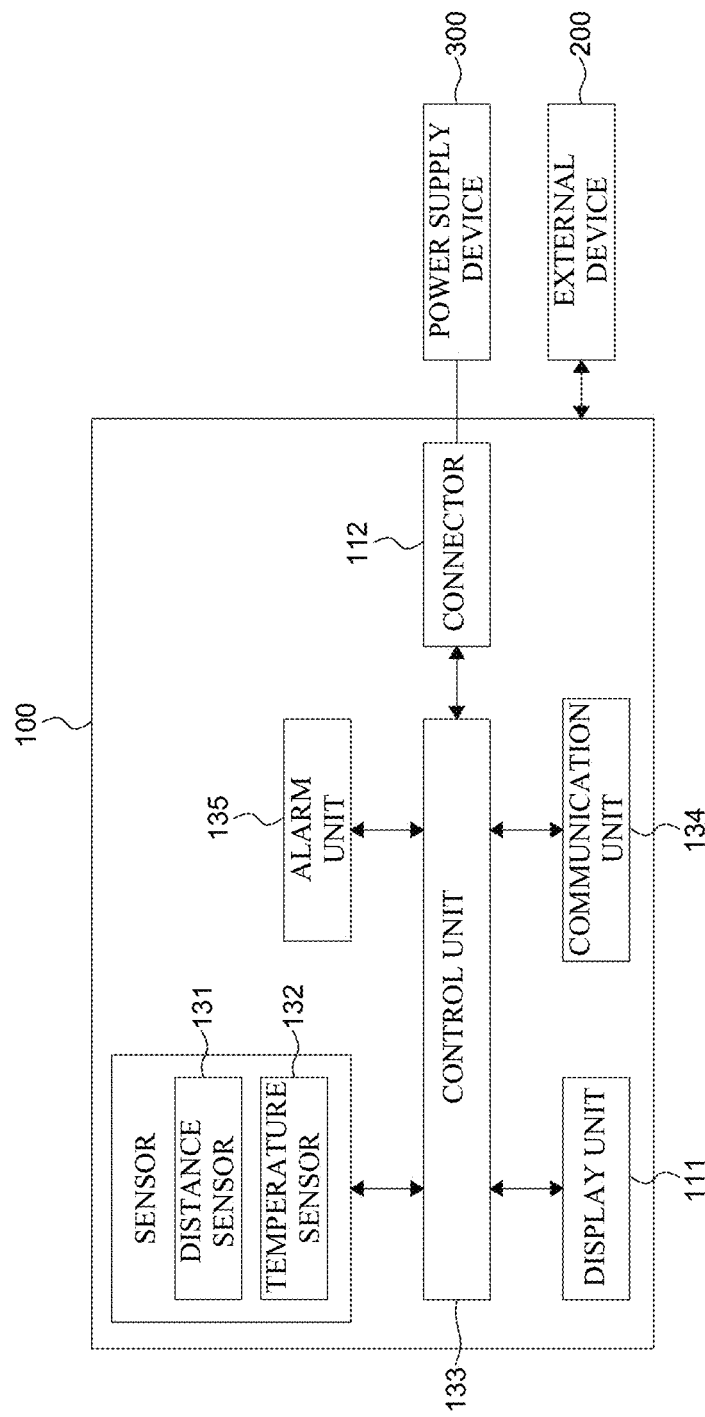
FIG. 3 is a schematic diagram of the non-contact temperature measuring device according to an exemplary embodiment of the present disclosure.

FIG. 3 is a schematic diagram of the non-contact temperature measuring device according to an exemplary embodiment of the present disclosure.

Referring to FIG. 3, the non-contact temperature measuring device 100 may include a distance sensor 131, a temperature sensor 132, a control unit 133, a communication unit 134, an alarm unit 135, the display unit 111, and the connector 112.

First, the distance sensor 131 is a sensor for measuring a distance to an object, and a measuring method of the distance sensor is a method for measuring a distance using a time difference by generating a measurement signal and detecting a signal reflected from the object. However, the present disclosure is not limited thereto, and various sensors and methods capable of measuring a distance may be used.

The temperature sensor 132 is a sensor for measuring a temperature of an object in a non-contact manner, and may be an infrared sensor. More specifically, the infrared sensor may be a sensor that absorbs energy radiated from an object by a light receiving unit to convert it into thermal energy and converts a temperature rise into an electric signal to detect it. However, the temperature sensor 132 is not limited to the infrared sensor described above, and may include sensors of various methods capable of measuring a temperature of an object.

The communication unit 134 connects the non-contact temperature measuring device 100 to the external device 200 such that the non-contact temperature measuring device 100 communicates with the external device 200. The communication unit 134 may be connected to the external device 200 using wireless communications to transmit and receive various types of data. For example, the wireless communications include short-range wireless communications such as Bluetooth, Near Field Communication (NFC), Radio-Frequency Identification (RFID), Wi-Fi, infrared communication and Zigbee, and long-distance wireless communications (mobile or wireless Internet communications) such as 3G, 4G (LTE), 5G, WiFi and Wibro, but are not limited thereto.

The communication unit 134 may transmit a temperature measured through the temperature sensor 132 and information regarding the temperature to the external device 200. Furthermore, the communication unit 134 may receive a command from the external device 200. More specifically, the communication unit 134 may receive various commands such as a temperature measurement command and a command for turning on/off power of the non-contact temperature measuring device 100 from the external device 200.

The alarm unit 135 may be configured to transmit pieces of information, such as on/off of power, an appropriate distance to a measurement object, completion of temperature measurement, and the like, to a user through perceptible stimulation. More specifically, the perceptible stimulation may include a sound such as a warning signal through a speaker of the non-contact temperature measuring device 100 and a vibration through a built-in motor, but is not limited thereto.

The display unit 111 may display various types of information to a user by using various contents (e.g., texts, images, videos, icons, banners, symbols or the like). For example, the display unit 111 may visually display the temperature of the object measured from the body unit 110. Further, the display unit 111 may display an ON/OFF state of the non-contact temperature measuring device 100, whether or not the non-contact temperature measuring device 100 operates, a battery state, time, date, and a communication state (whether communications such as Bluetooth and Wi-Fi are connected or not), but is not limited thereto and may display a variety of information collected from the non-contact temperature measuring device 100.

For example, the display unit 111 may be provided in the form of a liquid crystal display window capable of displaying images and texts in a color or black-and-white and also, may be provided in a form that can be displayed in letters and numbers depending on a situation as colored light sources flickers. However, a display form of the display unit 111 is not limited to the above-described forms, and may be provided in various forms.

Further, the display unit 111 may include a touch screen and receive a touch, a gesture, a proximity, a drag, a swipe or a hovering input using, for example, an electronic pen or a part of a user's body.

The connector 112 may be disposed on the first side surface of the body unit. The connector 112 is illustrated in a 5-pin form but is not limited thereto, and may include all of various forms such as an 8-pin connector and a C-type connector, capable of moving electricity, that is, supplying power, from a power supply device 300. In this case, the power supply device 300 may include all devices capable of supplying power to other devices by accommodating electricity therein, and may be a device the same as the external device 200. Accordingly, the non-contact temperature measuring device 100 may directly receive power of the external device 200 through the connector 112. That is, the non-contact temperature measuring device 100 may not include a battery therein, and may be supplied with power by receiving electric energy from the external device 200 to thereby be used. Therefore, since the non-contact temperature measuring device 100 does not include a battery therein, its own weight is reduced and thus portability thereof may be further facilitated. However, the present disclosure is not limited thereto, and the non-contact temperature measuring device 100 may include a battery so that energy can be supplied by itself without transmission of electrical energy from an external device, according to user convenience.

Furthermore, the connector 112 is connected to the external device 200 in a wired manner to transmit and receive various types of data, in addition to supplying power. In this case, the wired manner may include a USB, an IEEE 1394, Serial and Parallel, and the like, but is not limited thereto. Accordingly, the non-contact temperature measuring device 100 may interface various commands and data, in addition to electric energy supply, with the external device 200 through the connector 112.

The control unit 133 is operably connected to the distance sensor 131, the temperature sensor 132, the communication unit 134, the alarm unit 135, and the display unit 111, and may execute various commands capable of obtaining a temperature of an object and transmitting the obtained temperature.

More specifically, first, when a distance to an object measured from the distance sensor 131 is within a predetermined range, the control unit 133 may output an alarm signal so that the alarm signal of the alarm unit 135 can be transmitted to a user, transmit a display signal to the display unit 111, command the display unit 111 to display a measurable state, and command temperature measurement so that the temperature sensor 132 can measure the temperature of the object.

Next, when a predetermined period of time has elapsed and the temperature measurement of the temperature sensor 132 is completed, the controller 133 outputs an alarm signal so that the alarm signal of the alarm unit 135 can be transmitted again to the user and calculates a temperature in the form of a temperature signal number which is measured from the sensor 132 to thereby command that the temperature is displayed on the display unit 111.

Then, the displayed temperature is stored together with information on measured time and date, and the stored information may be commanded to be transmitted to the external device 200 through the communication unit.

Then, when there is no next measurement signal from the user within a predetermined period of time, the control unit 133 may be configured to automatically discontinue a power supply and be turned-off.

In this case, the output of the alarm signal through the control unit 133 may be transmitted not only to the alarm unit 135 built in the non-contact temperature measuring device 100, but also be transmitted to the external device 200 via the communication unit 134.

Figure 4:
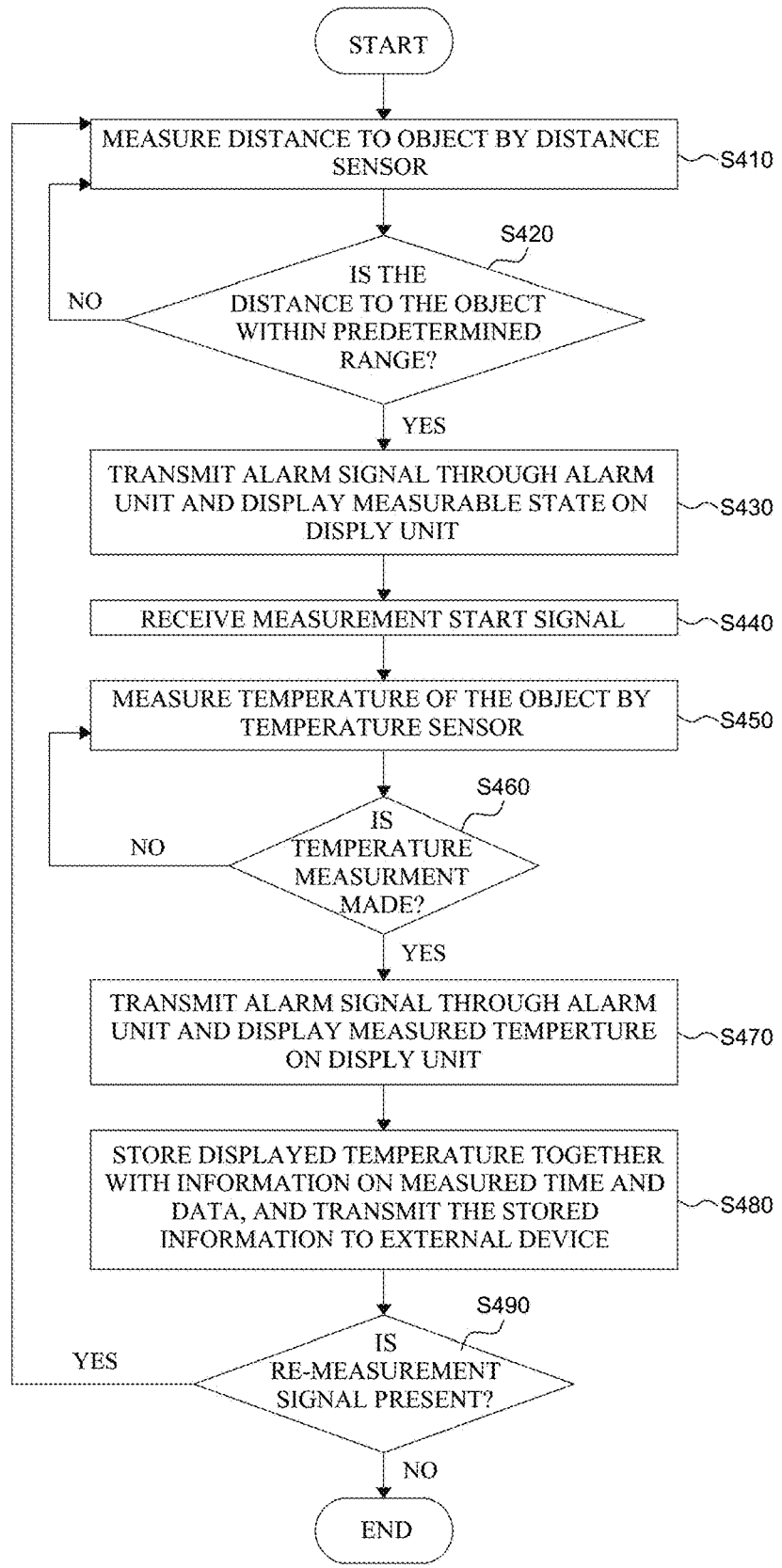
FIG. 4 is a schematic flowchart illustrating a method for measuring temperature using the non-contact temperature measuring device according to an exemplary embodiment of the present disclosure.

FIG. 4 is a schematic flowchart illustrating a method for measuring temperature using the non-contact temperature measuring device according to an exemplary embodiment of the present disclosure. Accordingly, a method (driving) for performing the non-contact temperature measuring device 100 will be described with reference to FIG. 4. In this case, operations described below may be performed by the control unit 133 of the non-contact temperature measuring device 100.

Referring to FIG. 4, the non-contact temperature measuring device 100 measures presence or absence of an object and a distance through the distance sensor based on a user's signal on whether or not measurement is made, in step S410, and when the object exists, may determine a measurement state depending on the distance to the object, in step S420.

In this case, the user's signal on whether or not measurement is made may be transmitted through the measurement button formed on the body unit of the non-contact temperature measuring device 100, or may be transmitted by being received from an external device connected through the communication unit.

Then, when the distance to the object measured through the distance sensor is within a predetermined range, an alarm signal such as a sound and a vibration, informing of a temperature-measurable state, is transmitted to the user, and further, the measurable state may be displayed on the display unit so that the user can visually recognize it, in step S430. The display of the measurable state may be performed not only in the non-contact temperature measuring device 100 but may also be performed in an external device which is connected via the communication unit, through transmission of the signal.

At this time, when the presence of the object is not measured through the distance sensor, or the distance to the object exceeds a predetermined range, the distance sensor may be configured to continuously measure the presence or absence of the object and the distance.

Further, the distance of the predetermined range to the object may be 2 cm to 5 cm, but is not limited thereto, and may be variously set according to a measurable range of the temperature sensor. However, a measurement range of the temperature sensor that can be mounted in a small non-contact temperature measuring device 100 may be, preferably, 2 cm to 5 cm.

Furthermore, an indication of the measurable state which is displayed on the display unit may be provided in the form of a liquid crystal display window capable of displaying images and texts in a color or black-and-white, and may also be provided in a form that can be displayed in letters and numbers depending on a situation as colored light sources flickers. However, the present disclosure is not limited thereto.

Then, the non-contact temperature measuring device 100 receives a measurement start signal of the user in step S440, transmits an execution signal to the temperature sensor so that a temperature of the object can be measured based on the received measurement start signal, and may measure the temperature of the object in step S450.

In this case, the measurement start signal of the user may be transmitted through the measurement button formed on the body unit of the non-contact temperature measuring device 100, or may be transmitted by being received from an external device connected through the communication unit.

Next, the non-contact temperature measuring device 100 may determine whether or not the temperature of the object is successfully measured through the temperature sensor in step S460. More specifically, when measurement of the temperature of the object through the temperature sensor is successful, the non-contact temperature measuring device 100 transmits an alarm signal such as a sound and a vibration, informing of measurement completion, to the user, and the measured temperature can be displayed on the display unit in S470.

At this time, when the measurement of the temperature of the object through the temperature sensor fails, the temperature sensor may be configured to continuously measure the temperature.

Then, the non-contact temperature measuring device 100 may store measured time and date information together with the temperature displayed on the display unit, and transmit the stored information to an external device through the communication unit, in step S480. In this case, since an application, a program, a widget, a browser or the like is installed in the external device, the measured information received from the non-contact temperature measuring device 100 may be displayed.

Furthermore, the information received by the external device is not a one-time basis, and is stored in a storage medium and can be continuously monitored. Accordingly, as the temperature measured from the non-contact temperature measuring device 100 can be monitored, the user can manage a state of the object in real time.

Next, the non-contact temperature measuring device 100, depending on whether or not a re-measurement signal by the user is present, may automatically discontinue a power supply and be turned-off after a predetermined period of time has elapsed, or may re-measure a distance to the object through distance sensor, in step S480.

In accordance with the structure and operations of the non-contact temperature measuring device 100 according to the embodiment of the present disclosure above, the present disclosure allows anyone to easily measure the temperature of an object in a non-contact manner, and the measured temperature can be easily transmitted to a user's device (external device). Further, information regarding the temperature transmitted to the user's device is stored so as to be continuously monitored, so that the user can manage the measurement object in real time.

Hereinafter, various exemplary embodiments in which the non-contact temperature measuring device 100 may be performed will be described in detail.

Figure 5:
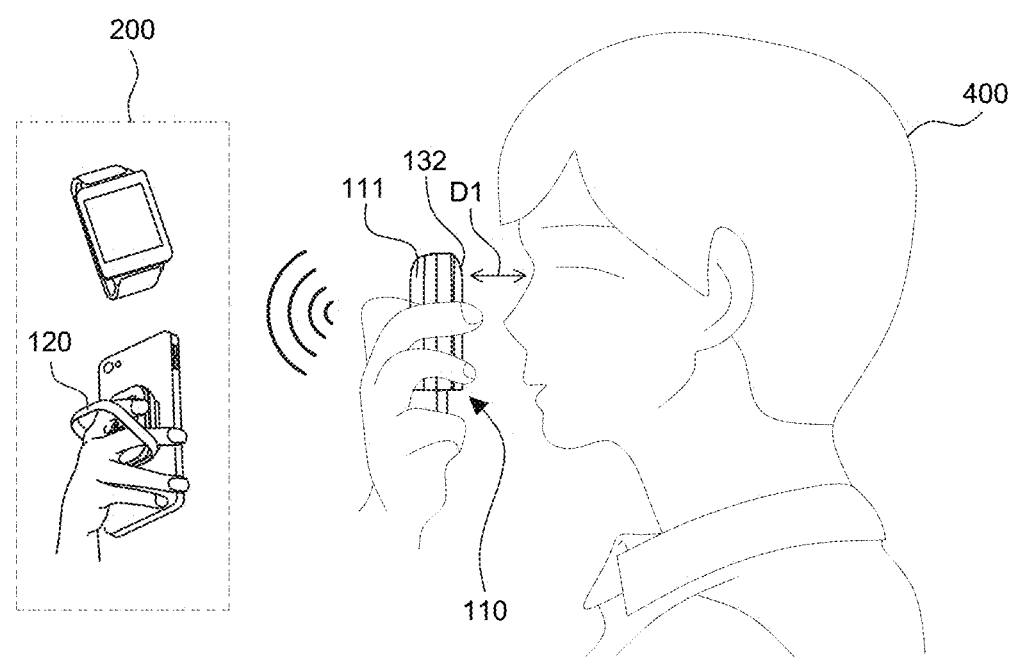
FIG. 5 is an exemplary view for explaining a body temperature measurement region of the non-contact temperature measuring device according to an exemplary embodiment of the present disclosure.

FIG. 5 is an exemplary view for explaining a body temperature measurement region of the non-contact temperature measuring device according to an exemplary embodiment of the present disclosure.

The non-contact temperature measuring device 100 may include the body unit 110 and the fixing unit 120, and when a temperature of an object 400 is measured, the body unit 110 may be separated from the fixing unit 120 to be used.

The fixing unit 120 is attached to the external device 200 such as a smartphone to fix and store the body unit 110 therein, and when temperature measurement is not used, it can be used as a grip for a stable grip feeling of the external device 200.

The body unit 110 may be separated from the fixed part 120 and measure the temperature of the object 400 through the temperature sensor 132 present on the rear surface of the body unit 110.

In this case, a distance D1 to the object 400 may be 2 cm to 5 cm, but is not limited thereto, and may be variously set according to a measurable range of the temperature sensor capable of being mounted in the non-contact temperature measuring device 100 having a small size.

Further, a measurement region of the object 400 that can be measured by the temperature sensor 132 of the body unit 110 is illustrated as a forehead, but is not limited thereto, and may include various regions such as a skin with little body hair, an oral cavity, both eyes, genital organs, an inner ear and an external anus.

Further, temperature measurement through the temperature sensor 132 of the body unit 110 may be performed through surfaces of various objects such as animals, things, and food, as well as humans.

Furthermore, the temperature of the object 400 measured through the temperature sensor 132 of the body unit 110 can be checked in real time on the display unit 111 of the body unit 110 and the external device 200 that is a user device. In addition, it may be received together with date and time information through wireless communications and stored in the external device 200 to thereby be monitored.

Figure 6:
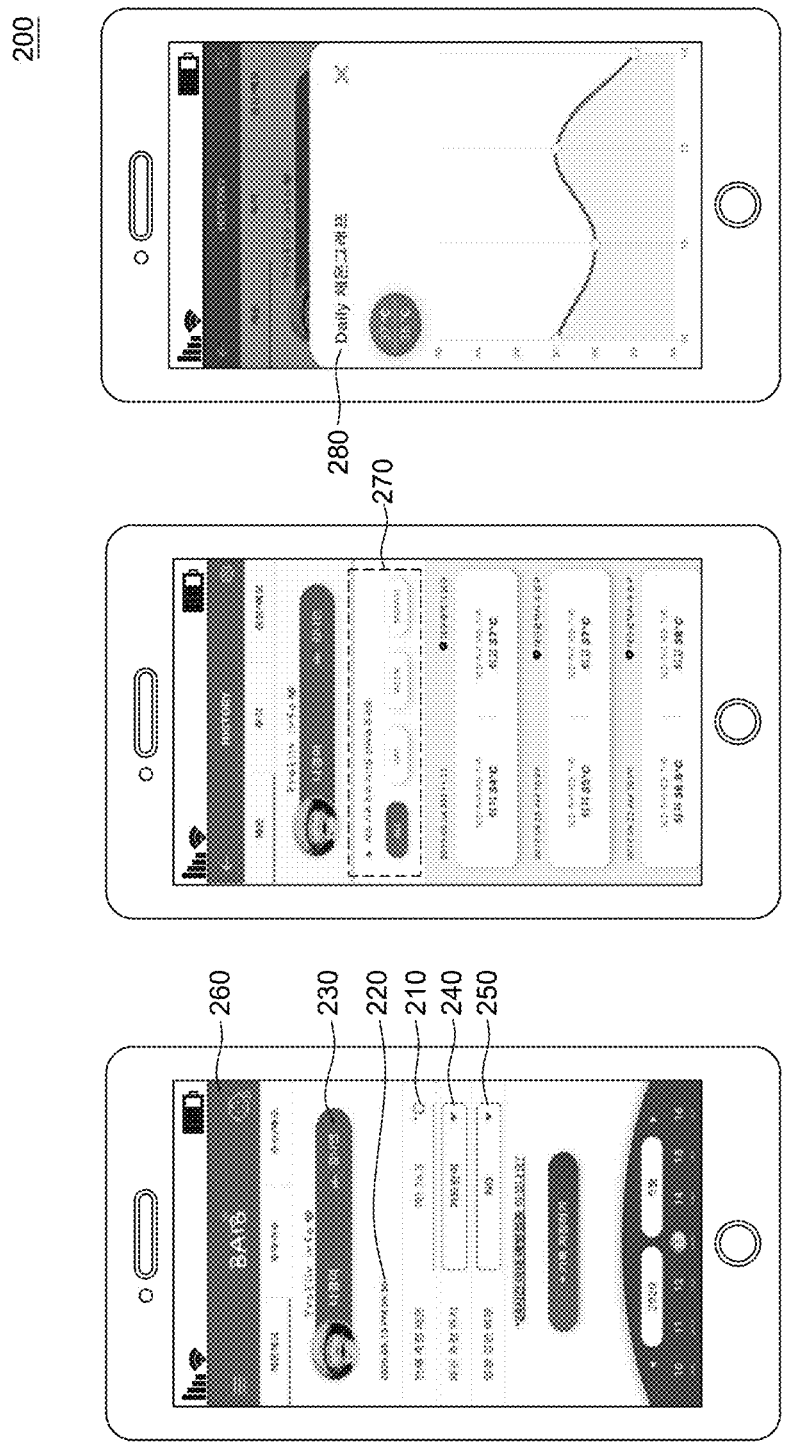
FIG. 6 is an exemplary view of an interface screen showing information measured in the non-contact temperature measuring device according to an exemplary embodiment of the present disclosure.

More specifically, referring to FIG. 6, an exemplary view of an interface screen showing information measured in the non-contact temperature measuring device according to an exemplary embodiment of the present disclosure is illustrated. The temperature of the object 400 measured through the temperature sensor 132 of the body unit 110 is received by the external device 200, which is a user device, and can be displayed through an application 260 installed in the external device 200. At this time, not only a temperature 210 displayed in the application 260 but also information 220 on a date and time at which the temperature is measured may be displayed, and a measured object 230, a location 240 where the temperature is measured, and whether other diseases are present 250 may be set by the user and stored together.

Furthermore, the stored temperature information is stored by date, so that the user can search and query 270 the temperature of the object at a desired date and time, at any time, and the stored temperature information is converted to a graph 280 and may be provided so that the user can monitor the temperature of the object.

Accordingly, the non-contact temperature measuring device 100 according to an exemplary embodiment of the present disclosure provides the application 260 capable of storing and displaying the temperature of the object and information regarding the temperature together, so that the user can more easily manage a temperature of a target.

Figure 7:
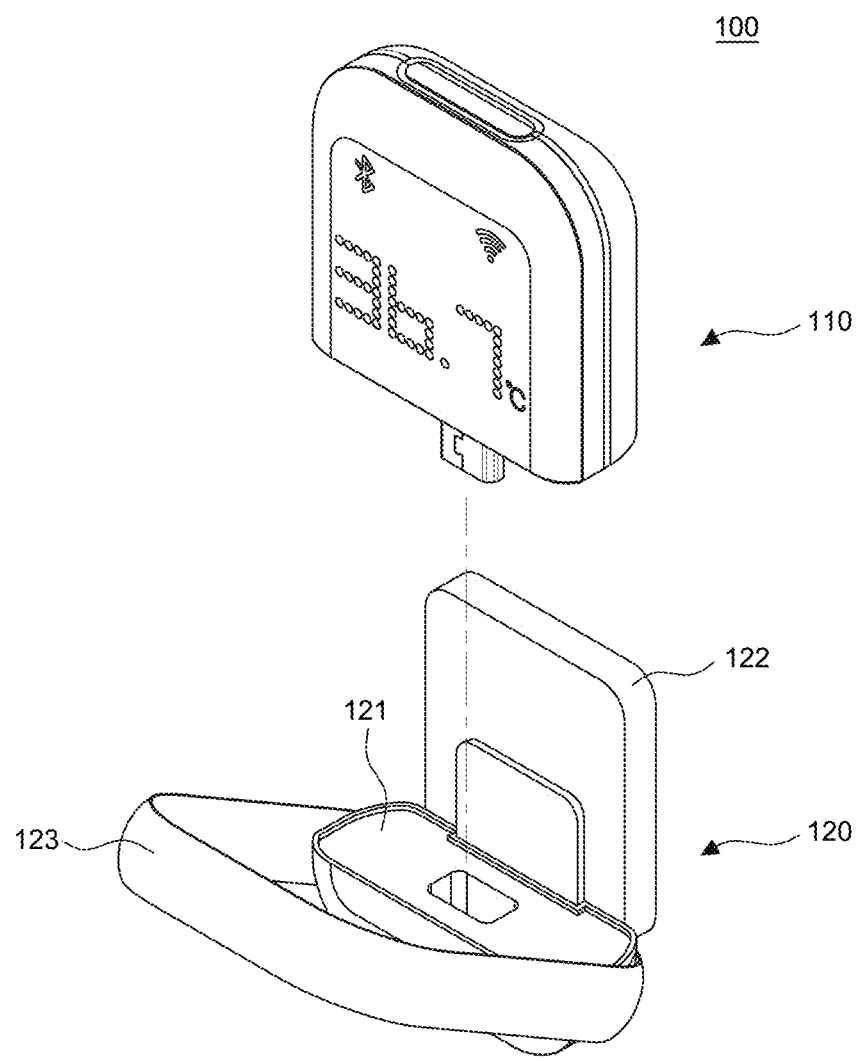
FIG. 7 is a perspective view for explaining a combination of the non-contact temperature measuring device according to an exemplary embodiment of the present disclosure.

FIG. 7 is a perspective view for explaining a combination of the non-contact temperature measuring device according to an exemplary embodiment of the present disclosure.

The non-contact temperature measuring device 100 includes the body unit 110 and the fixing unit 120. As the body unit 110 has a groove portion and a size corresponding to the coupling part 121 and the protrusion portion 125 present on the support part 122 of the fixing unit 120, the body unit 110 can be coupled to the fixing unit 120.

To couple the body unit 110 to the fixing unit 120, the outer part 123 of the fixing unit 120 may be configured to form a certain angle with the support part 122 and be rotated. Accordingly, the outer part 123 may form a certain angle with the support part 122, and the body unit 110 may be coupled to the fixing unit 120.

Further, after the body unit 110 is coupled to the fixing unit 120, the outer part 123 may be formed to be lowered in a state in which it is horizontal to the support part 122 and surround an outer surface of the body unit 110. Thus, the body unit 110 is firmly fastened to the fixing unit 120, and can be easily kept, and even when used for a long time, the fixing unit 120 is not easily loosened, thus minimizing a risk of loss of the body unit 110.

Meanwhile, the above-described fixing unit 120 may be used not only for storing the body unit 110 but also used for more various purposes.

Figure 8A:
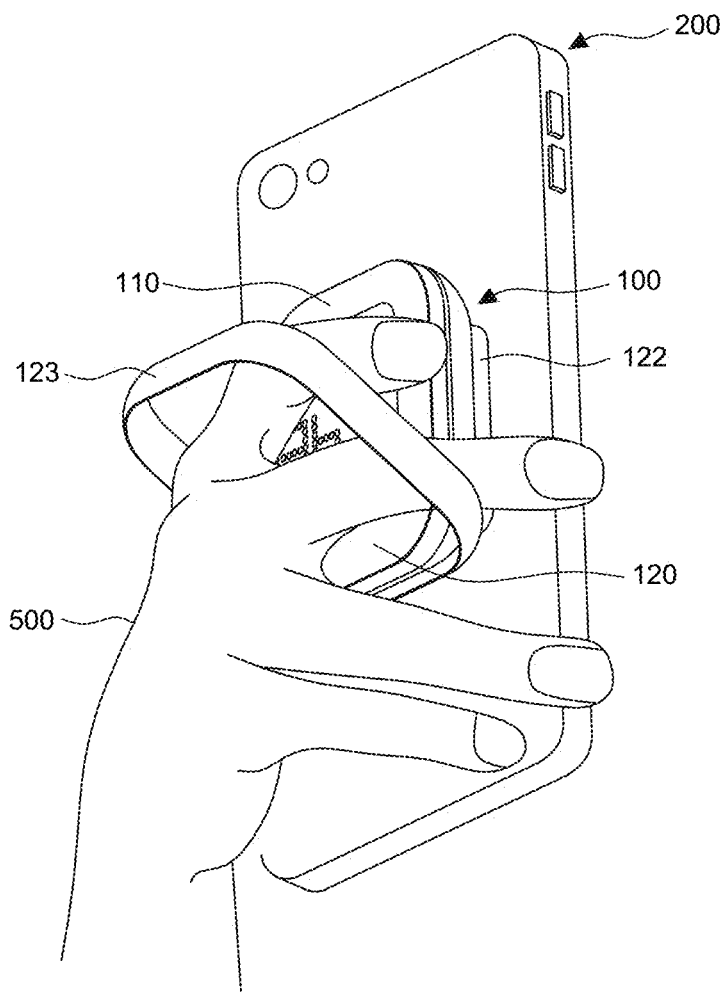
FIG. 8A is an exemplary view for explaining a method of using the non-contact temperature measuring device according to an exemplary embodiment of the present disclosure as a grip.

More specifically, referring to FIG. 8A, an exemplary view for explaining a method of using the non-contact temperature measuring device according to an exemplary embodiment of the present disclosure as a grip is illustrated.

The non-contact temperature measuring device 100 may be used by attaching a rear side of the fixing unit 120 to the external device 200 such as a smartphone. At this time, as the outer part 123 of the fixing unit 120 forms a certain angle with the support part 122, the non-contact temperature measuring device 100 may be used as a grip in which a user's hand 500 is inserted to stably hold the external device 200.

Further, in FIG. 8A, the body unit 110 and the fixing unit 120 are illustrated as being coupled and used, but the present disclosure is not limited thereto. And, the body unit 110 and the fixing unit 120 are separated from each other and only the fixing unit 120 can be used.

Accordingly, the non-contact temperature measuring device 100 not only measures a temperature of an object but is also applied to the external device 200 so that a user can stably check the temperature measured. Furthermore, the non-contact temperature measuring device 100 may be used as a grip not only for checking the temperature but also for other operations, thereby preventing the external device 200 from falling.

In addition, the non-contact temperature measuring device 100 includes the rotating plate on the rear surface of the support part 122, so that it can rotate in a horizontal direction, without being limited to rotation in a vertical direction as illustrated in FIG. 8A. At this time, the outer part 123 is illustrated to tilt from the above, but as the rotating plate is included in the rear side, the non-contact temperature measuring device 100 is rotated by 180° and thus, the outer part 123 can tilt from the below.

Figure 8B:
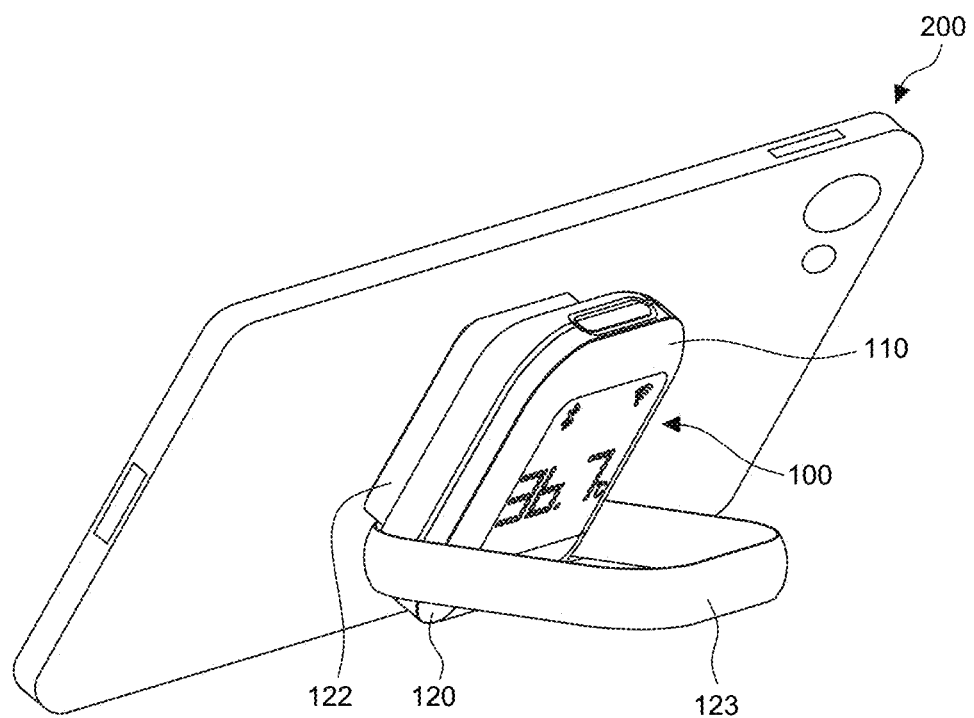
FIG. 8B is an exemplary view for explaining a method of using the non-contact temperature measuring device according to an exemplary embodiment of the present disclosure as a cradle.

More specifically, referring to FIG. 8B, an exemplary view for explaining a method of using the non-contact temperature measuring device according to an exemplary embodiment of the present disclosure as a cradle is illustrated.

The non-contact temperature measuring device 100 may be used by attaching the rear side of the fixing unit 120 to the external device 200 such as a smartphone. At this time, the outer part 123 of the fixing unit 120 forms a certain angle with the support part 122, whereby the non-contact temperature measuring device 100 can be used by standing the external device 200 in the horizontal direction.

Further, as in FIG. 8A, the outer part 123 is illustrated to tilt from the above, but as the rotating plate is included in the rear side, the non-contact temperature measuring device 100 is rotated by 180° and thus, the outer part 123 can tilt from the below.

Accordingly, user convenience may be provided in a state in which a user views an image through the external device 200 such as a smartphone.

Although the embodiments of the present disclosure have been described in detail with reference to the accompanying drawings, it is to be understood that the present disclosure is not limited to those embodiments and various changes and modifications may be made without departing from the scope of the present disclosure. Therefore, the embodiments disclosed in the present disclosure are intended to illustrate rather than limit the scope of the present disclosure, and the scope of the technical idea of the present disclosure is not limited by these embodiments. Therefore, it should be understood that the above-described embodiments are illustrative in all aspects and not restrictive. The scope of the present disclosure should be construed according to the claims, and all technical ideas within the scope of equivalents should be construed as falling within the scope of the present disclosure.

What is claimed is:

1. A non-contact temperature measuring device, comprising:
   a body unit;
   a fixing unit to which the body unit is coupled;
   a distance sensor configured to measure a distance to an object;
   a temperature sensor configured to measure a temperature of the object;
   a control unit operatively connecting the distance sensor and the temperature sensor to obtain the temperature of the object;
   a display unit displaying the temperature obtained; and
   a connector configured to supply power,
   wherein the fixing unit includes:
   a coupling part including a receiving groove capable of receiving the connector of the body unit;
   a support part connected to the coupling part and having an adhesive surface for bonding to another device; and
   an outer part configured to be connected to the coupling part, and when the body unit is fastened to the coupling part, surrounds an outer surface of the body unit.

2. The non-contact temperature measuring device of claim 1, further comprising: an alarm unit configured to be connected to the control unit and generate an alarm.

3. The non-contact temperature measuring device of claim 2, wherein the control unit is further configured to transmit an alarm signal to the alarm unit when measurement of the temperature of the object is completed.

4. The non-contact temperature measuring device of claim 1, further comprising: a communication unit configured to transmit the temperature that is measured by the temperature sensor and calculated by the control unit to an external device.

5. The non-contact temperature measuring device of claim 1, wherein the body unit further includes a measurement button disposed on a side surface of the body unit.

6. The non-contact temperature measuring device of claim 1, wherein the coupling part has rotation guide holes in both sides thereof so that the outer part is coupled to the rotation guide holes.

7. The non-contact temperature measuring device of claim 6, wherein the outer part includes rotation guides that protrude to both inner surfaces thereof and are received in the rotation guide holes, and is rotated to form a certain angle with the support part.

8. The non-contact temperature measuring device of claim 1, wherein the body unit includes a hole exposing the distance sensor and the temperature sensor.

9. The non-contact temperature measuring device of claim 1, wherein the support part includes a rotating plate on a rear surface thereof.

10. The non-contact temperature measuring device of claim 1, wherein the control unit is configured to measure the distance to the object through the distance sensor, measure the temperature of the object through the temperature sensor when the distance measured to the object is within a predetermined range, and transmit the temperature measured to the display unit to thereby display temperature information through the display unit.

11. The non-contact temperature measuring device of claim 10, wherein the predetermined range is 2 cm to 5 cm.

12. The non-contact temperature measuring device of claim 1, wherein the control unit is configured to transmit a display signal to the display unit and display a measurable state on the display unit, when the distance measured to the object is within a predetermined range.

13. The non-contact temperature measuring device of claim 1, wherein the control unit is configured to automatically discontinue a power supply and be turned off when there is no measurement signal within a predetermined period of time.

14. The non-contact temperature measuring device of claim 1, wherein the control unit is configured to store information on a date and time at which the temperature is measured, together with the temperature.

* * * * *